United States Patent [19]

Leitnaker et al.

[11] 3,708,433
[45] Jan. 2, 1973

[54] STABILIZED URANIUM OR URANIUM-PLUTONIUM NITRIDE FUEL

[75] Inventors: James M. Leitnaker, Kingston, Tenn. 37763; Karl E. Spear, II, State College, Pa. 16801

[73] Assignee: The United States of America as represented by the United States Atomic Energy Commission

[22] Filed: Aug. 27, 1970

[21] Appl. No.: 67,452

[52] U.S. Cl. ................. 252/301.1 R, 23/344, 23/346
[51] Int. Cl. ........................................... G21c 21/00
[58] Field of Search ...... 176/66, 67, 91; 252/301.1 R; 23/344, 346, 347; 75/205

[56] References Cited

UNITED STATES PATENTS

| | | | |
|---|---|---|---|
| 3,096,263 | 7/1963 | Kingston | 75/205 X |
| 3,211,664 | 10/1965 | Endebrock | 23/347 X |
| 3,213,032 | 10/1965 | Hammond | 23/347 X |
| 3,510,434 | 5/1970 | Weber et al. | 23/344 X |
| 3,126,323 | 3/1964 | Leggett et al. | 176/91 X |
| 2,756,489 | 7/1956 | Morris | 176/91 X |

*Primary Examiner*—Carl D. Quarforth
*Assistant Examiner*—G. G. Solyst
*Attorney*—Roland A. Anderson

[57] ABSTRACT

A nuclear fuel composition which exhibits minimal reaction with stainless steel cladding at reactor service conditions is provided comprising a metal-containing uranium or uranium-plutonium nitride composition which forms, under reactor service conditions, a $UXN_2$ or $(U, Pu)XN_2$ compound as a separate stable phase where X is a metal selected from the group consisting of vanadium, chromium and niobium. These compounds are formed by reaction of fuel with excess nitrogen as the nitrogen is produced from fuel burnup in the reactor. Thus, the nitrogen equilibrium pressure is stabilized to a value below that which will react with the stainless steel cladding.

7 Claims, 3 Drawing Figures

STABILIZED URANIUM OR URANIUM-PLUTONIUM NITRIDE FUEL

BACKGROUND OF THE INVENTION

The invention described herein was made in the course of, or under, a contract with the United States Atomic Energy Commission. It relates generally to nitride nuclear reactor fuels and more particularly to a high temperature uranium or uranium - plutonium nitride fuel which is stabilized to nitrogen release at reactor service conditions, i.e., exposure to a neutron flux and operating temperatures which are selected for the particular reactor design.

The excellent nuclear and physical properties—fissile density, thermal conductivity, and thermal expansion of uranium nitrides or uranium - plutonium nitrides makes them particularly attractive as nuclear fuels, such as for a fast breeder reactor. One problem of such fuels, however, is that excess nitrogen is produced during service. This excess nitrogen comes about both through the fissioning of uranium or plutonium and the reaction of the nitride fuel with oxygen which may diffuse into the system. Excess nitrogen is undesirable because it reacts with the fuel cladding causing embrittlement.

It is, therefore, an object of this invention to provide a uranium or uranium - plutonium nitride composition which exhibits minimal reaction with stainless steel cladding at service conditions.

SUMMARY OF THE INVENTION

We have discovered that a $UXN_2$ or $(U, Pu)XN_2$ compound, X being a metal selected from vanadium, chromium or niobium, could be formed as a separate stable phase which serves as a nitrogen sink to accommodate excess nitrogen within the composition in uranium or uranium - plutonium nitride fuels as the fuel is burned and thus stabilize the nitrogen pressure in the system to a value which will preclude reaction with stainless steel. This $UXN_2$ or $(U, Pn)XN_2$ compound is formed by providing an amount of the aforementioned metal in a uranium or uranium - plutonium nitride composition and reacting the composition within a nuclear reactor under service conditions. In one embodiment of the invention applicants demonstrated the formation of a vanadium-containing uranium nitride composition by reacting uranium mononitride with vanadium nitride at 1,450°C and 580 torr nitrogen whereby a novel ternary compound $UVN_2$ was positively identified as a separate phase. The value of nitrogen equilibrium pressure in the $UN-UVN_2-V_2N$ region was found to be between 0.08 and $10^{-5}$ torr at 1,450°C which is below the nitrogen equilibrium pressure (0.1 torr) over the chromium nitride - chromium system at 1,450°C.

In another embodiment of the invention applicants demonstrated the formation of a stabilized chromium - containing uranium nitride composition by reacting uranium mononitride and chromium nitride powders at 1,600°C and 400 torr nitrogen whereby the ternary compound $UCrN_2$ was identified as a separate phase. The value of the nitrogen equilibrium pressure in the $UN-UCrN_2-Cr$ region was found to be below the corresponding nitrogen equilibrium pressure over the chromium nitride - chromium system.

Owing to the minimal reaction of these stabilized fuels with stainless steel cladding, the fuels of this invention provide a distinct advance in the liquid metal fast breeder reactor technology.

DESCRIPTION OF THE PREFERRED EMBODIMENT

The stabilized fuel compositions of this invention may be prepared from conventional materials. Generally, any uranium or uranium - plutonium compound and any suitable metal (i.e., vanadium, chromium, niobium or molybdenum) compound which is provided in an effective amount may be used as the starting materials, subject only to the condition that the compounds can be reacted under reactor service conditions to form a composition having a nitrogen equilibrium pressure below that necessary to nitride any component in stainless steel. By an "effective amount" it is meant sufficient metal to provide the nitrogen sink within the reacted composition.

One embodiment of the invention consists of blending the desired quantity of uranium or uranium - plutonium mononitride and vanadium nitride powders into a mixture and pressing the mixture into pellets. The pellets are then sintered with suitable adjustment of the nitrogen content, if necessary, and fabricated into a suitable fuel configuration.

In another embodiment uranium (or uranium - plutonium) dioxide is mixed with finely divided carbon and an oxide of the desired metal, such as vanadium, and the mixture heated in nitrogen to form a nitrided mixture of uranium (or uranium - plutonium) and vanadium. The resulting nitrided mixture is then pressed into pellets, sintered with suitable adjustment of the nitrogen content, if necessary, and fabricated into a suitable fuel configuration.

It should be apparent that the amount of metal will vary for each fuel composition. There is, however, a critical amount of metal for each composition which, once it has been empirically determined, will operate successfully in providing the requisite nitrogen sink, thereby accommodating within the reacted composition excess nitrogen as it is produced and precluding continued rise in the nitrogen equilibrium pressure to a value which will nitride the cladding.

Figure 1:
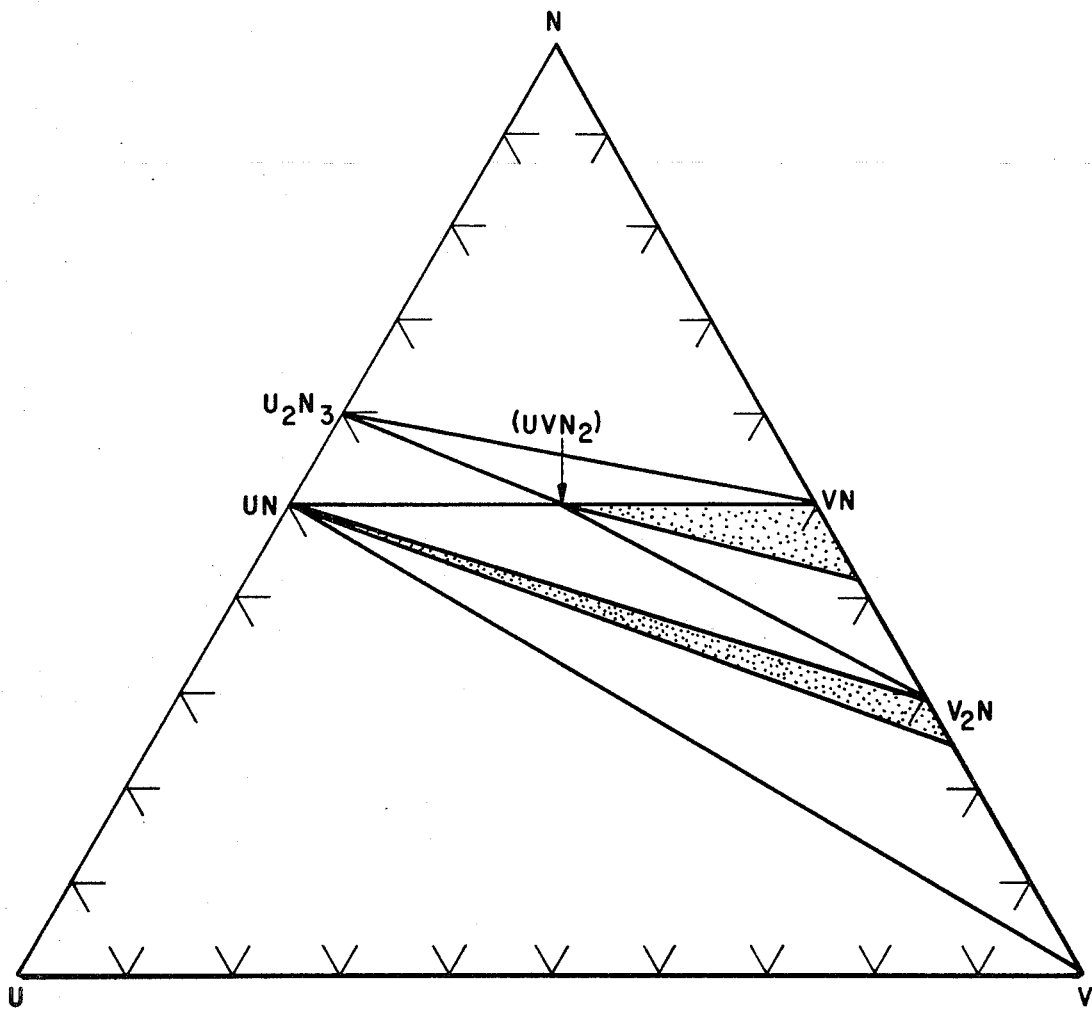
FIG. 1 is a phase diagram of the ternary system uranium, nitrogen and vanadium.

In the vanadium - containing uranium nitride fuel the quantity of vanadium added should be sufficient that the composition remains in the regions below the $UN-UVN_2$ and $UVN_2-V_2N$ tie lines (FIG. 1) during the life of the reactor fuel. Suitable vanadium concentrations are from about 4 atom percent to about 10 atom percent (based on 2 year life of a fast breeder reactor fuel), the latter being an upper limit imposed by undesirable dilution of the uranium. Referring to FIG. 1, it may be seen that a number of constant pressure three-phase regions appear to exist in the U-V-N system; namely, $UN-U-V$, $UN-V_2N-V$, $UN-UVN_2-V_2N$, $UN-UVN_2-U_2N_3$, and $U_2N_3-UVN_2-VN$. While the last two regions are of constant pressure, the nitrogen equilibrium pressure at 1,400°C was found to be sufficiently large, i.e., value was above the $Cr_2N$-C line shown in FIG. 3, to react with the chromium in the stainless steel cladding at anticipated reactor cladding temperature of about 800°C. The composition, therefore, should always be maintained below the UN-$UVN_2$ and $UVN_2$-$V_2N$ tie lines of FIG. 1; thus, providing a nitrogen pressure (< 0.08 atmosphere at 1,400°C) which will not react with the stainless steel cladding at anticipated reactor cladding temperatures.

Figure 2:
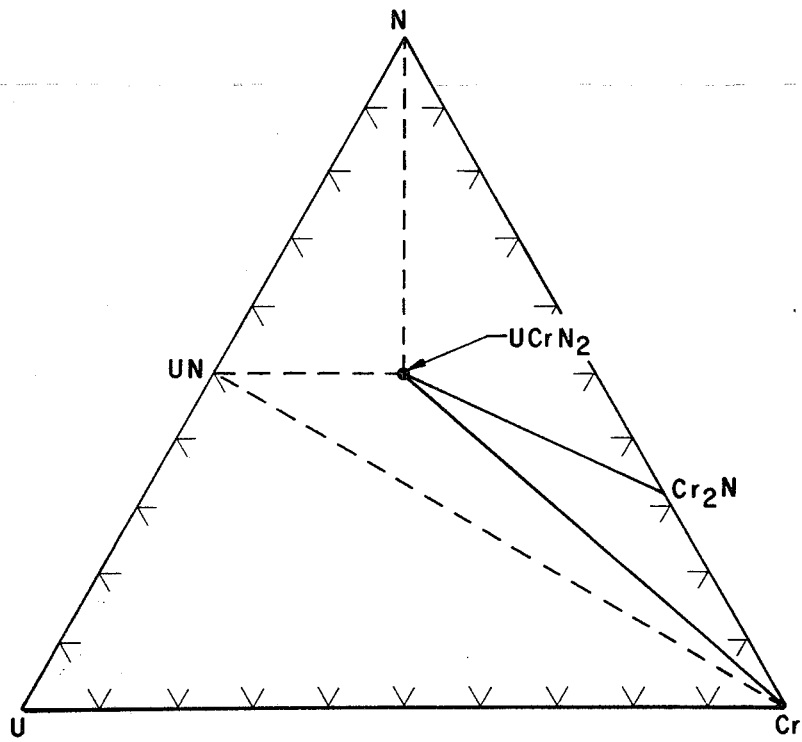
FIG. 2 is a phase diagram of the ternary system uranium, nitrogen and chromium.

In the chromium - containing uranium nitride fuel the quantity of chromium added should be sufficient that the composition is maintained below the UN-$UCrN_2$ and $UCrN_2$-Cr tie lines of FIG. 2. Suitable chromium concentrations are from about 4 atom percent to about 10 atom percent.

In a similar fashion to the vanadium - and chromium - containing fuel compositions a niobium - containing fuel composition may be formed under reactor service conditions to provide a fuel composition which is stabilized with respect to nitrogen release during fuel burnup.

While the exact phases present in the stabilized nitride compositions of this invention have not been conclusively established at temperature, the separate $UXN_2$ or $(U, Pu)XN_2$ compound, when formed in accordance with this invention, acts, irrespective of the phase makeup of these stabilized nitride compositions, as a buffer or sink for disposing of excess nitrogen as it becomes available by preventing the nitrogen equilibrium pressure over the system from rising to a value wherein reaction with the most easily nitrided component of stainless steel cladding would take place.

The temperature at which the separate $UXN_2$ or $(U, Pu)XN_2$ compound is formed may vary over a wide range. It is important insofar as the temperature parameter is concerned that a high enough temperature be used to insure that the nitrogen sink can be formed thereby achieving stabilization. Temperatures such as to be observed at the clad-fuel interface under reactor service conditions, i.e., about 800°C are quite suitable for the reaction which achieves stabilization.

EXAMPLE I

Ternary samples containing uranium, vanadium and nitrogen were prepared using mixtures of uranium mononitride and vanadium nitride, nitrided uranium - vanadium alloys, or mixtures of uranium mononitride and vanadium and formed into 0.25-inch diameter pellets compacted from −325 mesh (less than 44 $\mu$m) powders.

The respective samples which were contained in tungsten crucibles were heated in a vacuum induction furnace under constant pressure and temperatures for various lengths of time and then cooled to below red heat in 3 to 5 minutes. Temperatures and nitrogen pressures used were 1,400° to 2,000°C and 50 to 650 torr; a few samples were heated in vacuum. The nitrogen gas was passed through Drierite, a special form of anhydrous calcium sulfate commercially available from the W. A. Hammond Drierite Co., Xenia, Ohio, and over niobium - 1 percent zirconium chips at 800°C before use.

The phases present in each sample were determined by X-ray powder photographs and the phase diagram (FIG. 1) deduced from the results given in Table I below. The X-ray samples were prepared in an argon-filled glove box. Lattice parameters were determined with the use of Debye-Scherrer X-ray films by well known techniques, employing either nickel-filtered Cu $K\alpha$ or vanadium-filtered Cr $K\alpha$ radiation ($\alpha_1$, $\alpha_2$, and $\alpha_{1,2}$ were 1.54051, 1.54433 and 1.54178 A, respectively for copper and 2.78962, 2.29351 and 2.29092 A for chromium.

TABLE I

| Sample | Starting material [a] | Uranium to vanadium molar ratio | Annealing conditions | | | X-ray results [c] | | | | | |
|---|---|---|---|---|---|---|---|---|---|---|---|
| | | | Temperature (°C.) | P($N_2$)[b] (torr) | Time (hr.) | $V_2N$ | VN | $UVN_2$ | UN | $U_2N_3$ | $UO_2$ |
| 1 | UN, VN | 0.126 | 1,450 | 590 | 16 | | s | ms | | s | vw |
| 2 | UN, VN | 0.236 | 1,450 | 580 | 17 | | m | ms | | s | w |
| 3 | UN, VN | 0.258 | 1,600 | 400 | 6 | | m | s | | m | m |
| 41 | (d) | 0.279 | 1,800 | 200 | 2 | | ms | s | | | vw |
| 42 | 41 | 0.279 | 1,600 | ≤2×10⁻⁵ | 4 | m | | | s | | vw |
| 43 | 41 | 0.279 | (e) | ≤2×10⁻⁵ | e | m | | | s | | |
| 44 | (d) | 0.279 | 1,700 | 52 | 2 | f | | s | | | |
| 45 | 44 | 0.279 | 1,700 | 100 | 2 | f | | s | | | |
| 46 | (d) | 0.279 | 1,785 | 400 | 1 | f | | s | | | vw |
| 47 | 46 | 0.279 | 2,000 | 400 | 1 | f | | s | | | |
| 48 | (d) | 0.279 | 1,600 | 200 | 2 | f | | s | | | vw |
| 49 | 48 | 0.279 | 1,600 | 100 | 2 | | s | s | | | vw |
| 5 | UN, VN | 0.490 | 1,600 | 400 | 6 | | w | s | | s | w |
| 61 | UN, VN | 0.501 | 1,795 | 203 | 5 | | w | s | m | | w |
| 62 | 61 | 0.501 | 1,700 | 407 | 6 | | | s | vw | | w |
| 63 | 62 | 0.501 | 1,550 | ≤2×10⁻⁵ | 1 | m | | m | s | | w |
| 71 | 1, 10 | 0.54 | 1,410 | 590 | 50 | | | ms | | s | vw |
| 72 | 71 | 0.54 | 1,600 | 195 | 19 | | | s | | w | w |
| 73 | 72 | 0.54 | 1,600 | 90 | 66 | | | s | | | mw |
| 81 | UN, V | 0.93 | 1,400 | ≤2×10⁻⁵ | 3 | | | s | | | w |
| 82 | 81 | 0.93 | 1,600 | ≤2×10⁻⁵ | 2 | | | s | s | | |
| 91 | UN, VN | 1.03 | 1,790 | 203 | 5 | | | s | ms | m | w |
| 92 | 91 | 1.03 | 1,700 | 406 | 4 | | | s | m | mw | w |
| 93 | 92 | 1.03 | 1,550 | ≤2×10⁻⁵ | 1 | mw | | m | vs | | w |
| 10 | UN, VN | 1.19 | 1,450 | 590 | 16 | | | w | | s | |
| 111 | UN, VN | 1.95 | 1,790 | 207 | 2 | | | ms | s | | |
| 112 | 111 | 1.95 | 1,690 | 407 | 4 | | | s | s | ms | w |
| 12 | UN, VN | 6.04 | 1,450 | 590 | 16 | | | s | ms | mw | |
| 141 | 12, 15 | 7.3 | 1,450 | 570 | 68 | | | s | m | s | |
| 142 | 141 | 7.3 | 1,600 | 195 | 16 | | | | s | s | |
| 143 | 142 | 7.3 | 1,600 | 100 | 64 | | | w | s | s | |
| 15 | UN, VN | 10.5 | 1,450 | 650 | 16 | | | | | s | m |

[a] Numbers refer to samples, whose residues were used as starting material.
[b] All samples were cooled in the atmosphere shown except samples 44–48. The nitrogen atmosphere maintained during the heating of these five samples was pumped our as the samples cooled.
[c] Relative intensities of each phase diffraction pattern are indicated by s=strong, m=medium, w=weak, v=very.
[d] A uranium-vanadium alloy was nitrided.
[e] The temperature was varied between 1,600 and 2,000° C. for 20 minutes.
[f] Three lines of an unknown pattern were observed in samples 44–48.

Figure 3:
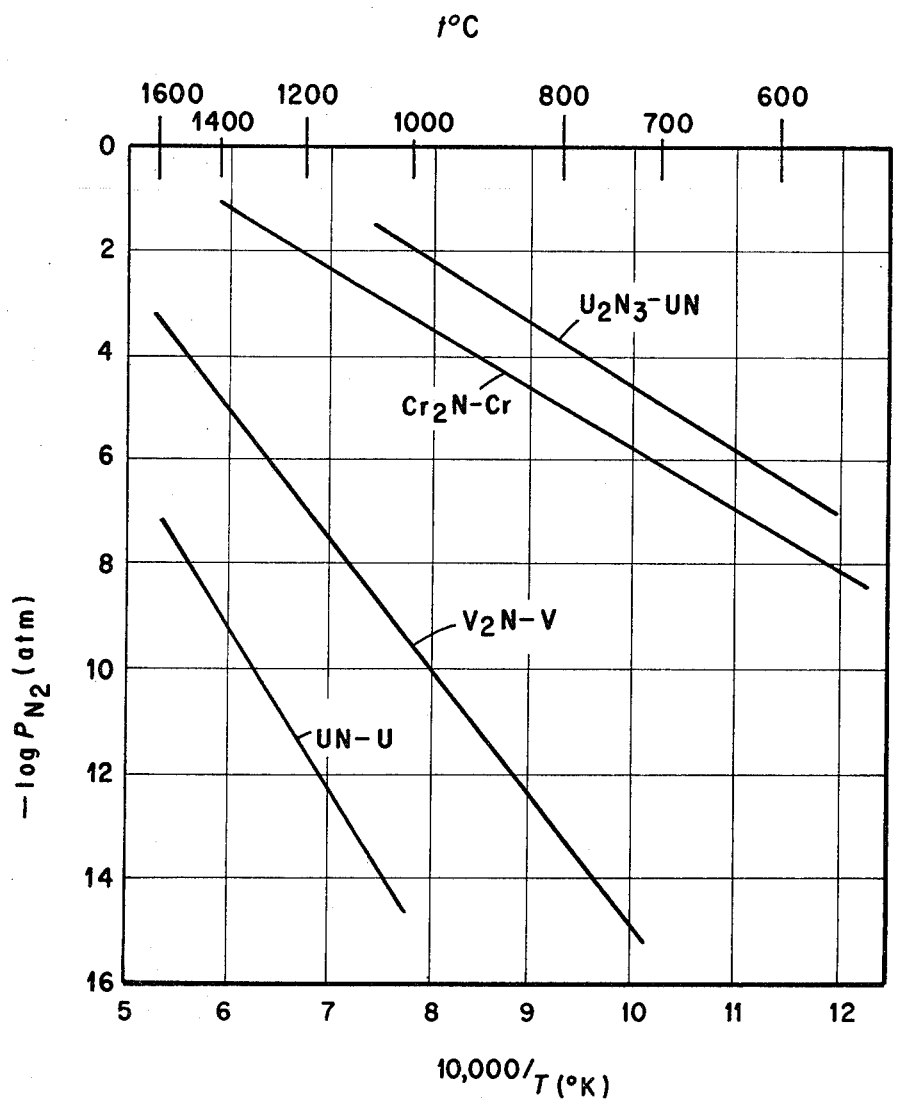
FIG. 3 is a plot of nitrogen equilibrium pressure over various nitride metal systems having the general reaction of $M_xN_{y+2} \rightleftarrows M_xN_y + N_{2(g)}$.

From FIG. 3 the nitrogen equilibrium pressure at 1,400°C over the chromium nitride - chromium (chromium being the most easily nitrided component of stainless steel) is 0.1 atmosphere. The nitrogen equilibrium pressure at 1,400°C for the composition with the area $UN-UVN_2-V_2N$ was determined to be between 0.08 and $10^{-5}$ atmosphere. At 800°C, which is the anticipated cladding temperature for stainless steel clad liquid metal fast breeder fuels, the nitrogen equilibrium pressure over the chromium nitride - chromium system is $\approx 10^{-5}$ atmosphere and for the composition within the area $UN-UVN_2-V_2N$ would be below $10^{-5}$ atmosphere. Accordingly, it may be seen that the compositions are stabilized with respect to nitrogen release and would preclude the nitrogen from reacting with the stainless steel cladding.

While most of the X-ray films of the ternary samples showed weak diffraction lines due to $UO_2$, the solubility of oxygen in UN, $UVN_2$, VN and $V_2N$ is small when the possibility for forming $UO_2$ exists; and it is estimated that the amount of oxygen dissolved in these phases is less than 0.2 weight percent. For compositions within the area $UN-UVN_2-V_2N$ this small amount of oxygen would not appreciably affect the phase relationships.

A novel ternary compound $UVN_2$, which is stable as a separate phase with respect to decomposition into UN and VN up to at least 2,000°C, was established. While the lattice parameter of the ternary compound was not measured as functions of the total content of uranium, vanadium, or nitrogen in the samples, visual comparisons of $UVN_2$ lines in films of all samples containing this phase showed no noticeable shift in these lines. From these comparisons it may be concluded that the homogeneity range of $UVN_2$ is probably small. The ternary $UVN_2$ compound is isomorphous with $UMoC_2$, has a calculated enthalpy of reaction of $-129 \pm 8$ kcal/mole at 298°K and has an entropy at 298°K of about 23.9 e.u. The orthorhombic lattice parameters of the ternary $UVN_2$ compound were calculated to be $a_o = 5.451 \pm 0.002$, $b_o = 3.185 \pm 0.001$, and $c_o = 10.667 \pm 0.003$ A, the uncertainties being as computed standard deviations. X-ray data for orthorhombic $UVN_2$ is given in Table II below.

TABLE II

| h | k | l | d-Spacing, A[a] Observed | d-Spacing, A[a] Calculated | Relative Intensity Observed | Relative Intensity Calculated |
|---|---|---|---|---|---|---|
| 1 | 0 | 1 | 4.79 | 4.85 | w | 4.4 |
| 1 | 0 | 2 | 3.77 | 3.81 | w | 2.2 |
| 0 | 1 | 1 | 3.03 | 3.05 | mw | 3.0 |
| 1 | 0 | 3 | 2.958 | 2.978 | m | 4.3 |
| 2 | 0 | 0 | 2.716 | 2.726 | w | 1.0 |
| 0 | 0 | 4 | 2.651 | 2.667 | ms | 2.9 |
| 1 | 1 | 1 |  | 2.662 |  | 1.4 |
| 2 | 0 | 1 | 2.629 | 2.641 | m | 3.1 |
| 1 | 1 | 2 | 2.434 | 2.444 | vs | 10.0 |
| 1 | 0 | 4 | b | 2.396 | vw | 0.3 |
| 0 | 1 | 3 |  | 2.372 |  | 0.4 |
| 1 | 1 | 3 | 2.171 | 2.175 | mw | 1.8 |
| 2 | 0 | 3 |  | 2.163 |  | 1.2 |
| 2 | 1 | 0 | 2.067 | 2.071 | m | 1.5 |
| 2 | 1 | 1 | 2.031 | 2.033 | w | 0.6 |
| 2 | 1 | 2 |  | 1.930 |  | 0.4 |
| 1 | 1 | 4 | 1.905 | 1.914 | w | 0.3 |
| 2 | 0 | 4 |  | 1.906 |  | 0.9 |
| 0 | 0 | 6 | 1.770 | 1.778 | ms | 0.2 |
| 0 | 1 | 5 |  | 1.773 |  | 1.7 |
| 3 | 0 | 2 | 1.719 | 1.720 | mw | 1.0 |
| 1 | 0 | 6 |  | 1.690 |  | 0.2 |
| 1 | 1 | 5 | 1.676 | 1.686 | mw | 0.2 |
| 2 | 0 | 5 |  | 1.680 |  | 1.2 |
| 2 | 1 | 4 | 1.632 | 1.636 | mw | 1.0 |
| 0 | 2 | 0 | 1.590 | 1.593 | mw | 1.1 |
| 3 | 1 | 1 | 1.558 | 1.561 | ms | 1.8 |
| 1 | 2 | 1 | 1.509 | 1.513 | vw | 0.4 |
| 3 | 0 | 4 | 1.498 | 1.502 | vw | 0.3 |
| 1 | 1 | 6 | 1.491 | 1.493 | m[c] | 1.6 |
| 2 | 1 | 5 |  | 1.486 |  | 0.6 |
| 1 | 2 | 2 | 1.465 | 1.469 | mw | 0.4 |
| 1 | 0 | 7 |  | 1.468 |  | 1.0 |
| 3 | 1 | 3 | 1.441 | 1.443 | vs | 2.0 |
| 1 | 2 | 3 | 1.403 | 1.404 | ms | 1.2 |
| 2 | 2 | 0 | b | 1.375 | vw | 0.4 |
| 0 | 1 | 7 |  | 1.375 |  | 0.1 |
| 0 | 2 | 4 |  | 1.367 |  | 1.2 |
| 2 | 2 | 1 | 1.365 | 1.364 | s[c] | 1.3 |
| 4 | 0 | 0 |  | 1.363 |  | 0.2 |
| 4 | 0 | 1 | 1.349 | 1.352 | m[c] | 0.8 |
| 2 | 1 | 6 | 1.332 | 1.349 | mw | 0.9 |
| 0 | 0 | 8 |  | 1.333 |  | 0.4 |
| 1 | 1 | 7 | b | 1.333 | vw | 0.4 |
| 1 | 2 | 4 |  | 1.326 |  | 0.2 |
| 1 | 0 | 8 | b | 1.295 | vw | 0.3 |
| 2 | 2 | 3 | 1.282 | 1.282 | w | 0.9 |
| 4 | 0 | 3 |  | 1.273 |  | 0.4 |
| 3 | 0 | 6 | 1.270 | 1.271 | mw | 0.6 |
| 3 | 1 | 5 |  | 1.269 |  | 0.4 |
| 4 | 1 | 0 | 1.254 | 1.253 | m | 0.7 |
| 4 | 1 | 1 | b | 1.244 | vw | 0.2 |
| 2 | 2 | 4 | 1.223 | 1.222 | s | 1.3 |
| 4 | 1 | 2 |  | 1.220 |  | 0.2 |
| 4 | 0 | 4 | b | 1.214 | vw | 0.5 |
| 1 | 1 | 8 | 1.200 | 1.200 | ms | 1.1 |
| 2 | 0 | 8 |  | 1.198 |  | 0.2 |
| 0 | 2 | 6 | 1.186 | 1.186 | vw | 0.5 |
| 4 | 1 | 3 |  | 1.182 |  | 0.1 |
| 3 | 2 | 2 | 1.168 | 1.169 | vs | 3.9 |
| 1 | 2 | 6 |  | 1.159 |  | 1.0 |
| 1 | 0 | 9 | 1.156 | 1.158 | s | 0.4 |
| 2 | 2 | 5 |  | 1.156 |  | 7.2 |
| 4 | 0 | 5 | b | 1.148 | m | 6.0 |

[a]The calculated values are for lattice parameters $a_o = 5.451$, $b_o = 3.185$, and $c_o = 10.667$ A.
[b]A very weak line was observed, but its d-spacing was not measured.
[c]The line was very diffuse.

EXAMPLE II

Ternary samples containing uranium, chromium, and nitrogen were prepared using mixtures of uranium mononitride and either chromium or chromium nitride powders (< 44 μm) and pressed into 0.25-inch diameter pellets. The pellets were heated at constant temperature and pressure for various lengths of time in tungsten crucibles in an induction furnace as in Example I and were cooled to below red heat in 3 to 5 minutes. Patterns of the starting materials showed only the lines of the respective phases; no impurity lines were observed.

The phases present in each sample were determined by X-ray powder photographs which were taken with Cu Kα radiation and the phase diagram (FIG. 2) deduced from the results given in Table III below.

TABLE III

| Sample | Starting Mixture | U:Cr Molar Ratio[a] | Annealing conditions[b] Temp. (°C) | Annealing conditions[b] P(N₂) (torr) | Annealing conditions[b] time (hr) | X-Ray results[c] Cr | X-Ray results[c] Cr₂N | X-Ray results[c] UCrN₂ |
|---|---|---|---|---|---|---|---|---|
| 1 | UN,Cr | 1.02 | 1600 | 400 | 5 |  |  | s |
| 2 | UN,Cr₂N | 0.25 | 1600 | 400 | 2 |  | m | s |
| 3 | UN,Cr₂N | 0.50 | 1600 | 400 | 2 |  | w | s |
|  |  |  | 1600 | 500 | 2 |  |  |  |
| 4[d] | UN,Cr₂N | 0.50 | 1300 | 500 | 8 |  | m | s |
| 5 | UN,Cr₂N | 0.25 | 1600 | 45 | 2 | m[e] |  | s |
| 6 | UN,Cr | 0.25 | 1600 | 100 | 2 |  | w | s |

[a]The molar ratios were calculated from the masses of starting material.
[b]Samples 1, 2, and 3 were cooled in 400 torr N₂; samples 4, 5, and 6 had the nitrogen pumped out while they cooled. To cool below red heat required 3 to 5 min.
[c]The relative intensities are indicated by s = strong, m = medium, and w = weak.
[d]Sample 4 was annealed at 1600°C and then 1300°C in the same experiment.
[e]Ductile metallic pieces were observed during preparation of x-ray specimens.

From the fact that the ternary compound $UCrN_2$ can exist in equilibrium with the metal demonstrates that the nitrogen equilibrium pressure in the area UN-$UCrN_2$-Cr is lower than that for $Cr_2N$-Cr line shown in FIG. 3 and therefore, the composition is stabilized with respect to nitrogen release. All of the samples had uranium-to-chromium molar ratios of 1.0 or smaller. A ternary compound approximating $UCrN_2$ was established. The $d$-spacings and line intensities of the ternary compound $UCrN_2$ are given in Table IV below.

TABLE IV

| $d$-spacing (A) | Intensity[a] | $d$-spacing (A) | Intensity[a] |
|---|---|---|---|
| 3.545 | mw | 1.416 | ms |
| 3.177 | w | 1.380 | w |
| 3.061 | mw | 1.305 | w |
| 2.745 | s | 1.286 | w |
| 2.563 | ms | 1.238 | mw |
| 2.466 | s | 1.193 | m |
| 2.048 | m | 1.165 | mw |
| 1.925 | ms | 1.147 | m |
| 1.862 | m | 1.102 | mw |
| 1.648 | mw | 1.090 | mw |
| 1.611 | vw | 1.072 | w |
| 1.591 | mw | 1.061 | m |
| 1.579 | mw | 1.028 | w |
| 1.551 | w | 1.015 | mw |
| 1.511 | ms | 1.000 | w |
| 1.453 | w | 0.989 | vw |

[a] s = strong, m = medium, w = weak, v = very.

What is claimed is:

1. A nuclear fuel comprising a uranium or uranium - plutonium nitride composition containing a $UXN_2$ or $(U, Pu)XN_2$ compound as a separate stable phase wherein said composition has, at a temperature in the range 500°–1,400°C, a nitrogen equilibrium pressure below that of the $Cr_2N$-Cr line of FIG. 3 and wherein X is a metal selected from the group consisting of vanadium, chromium, and niobium.

2. The fuel of claim 1 wherein said compound comprises $UVN_2$.

3. The fuel of claim 1 wherein said metal-containing uranium or uranium - plutonium nitride composition lies within the three phase UN-$UVN_2$-$V_2N$ region displayed in FIG. 1, said composition having a nitrogen equilibrium pressure at 1,400°C of less than 0.08 atmosphere.

4. The fuel of claim 1 wherein said compound comprises $UCrN_2$.

5. A nitrided nuclear fuel composition of the basic formula $UXN_2$ or $(U, Pu)XN_2$ wherein X is essentially of a metal selected from the group consisting essentially of a metal selected from the group consisting essentially of vanadium, chromium, and niobium, the concentration of the aforementioned elements in said composition being such that, at a temperature in the range 500°–1,400°C. it will not nitride stainless steel.

6. The composition of claim 5 in which the selected metal exists as a nitride and contains a separate $UXN_2$ compound where the composition contains uranium and contains a separate $(U, Pu)XN_2$ compound where the composition contains plutonium.

7. The composition of claim 6 wherein X is vanadium.

* * * * *